July 9, 1974 O. G. LEONARD ET AL 3,823,033

METHOD OF FORMING A HIGH DENSITY PLANAR CORE MEMORY

Filed March 9, 1972

2 Sheets-Sheet 1

METHOD OF FORMING A HIGH DENSITY PLANAR CORE MEMORY

Filed March 9, 1972 2 Sheets-Sheet 2

3,823,033
Patented July 9, 1974

3,823,033

METHOD OF FORMING A HIGH DENSITY PLANAR CORE MEMORY

Clive Gene Leonard, Lawndale, and Eliot Stone, Los Angeles, Calif., assignors to The National Cash Register Company, Dayton, Ohio Filed Mar. 9, 1972, Ser. No. 233,061
Int. Cl. C23c *13/02, 13/04*
U.S. Cl. 117—212 4 Claims

ABSTRACT OF THE DISCLOSURE

A method of depositing magnetic cores and their associated conductors and an improved thin-film core system, in which segments of conductors passing under a core are first laid down, then insulated, then the core is deposited and insulated, and finally the remainders of the conductors, i.e., segments passing above the core, are deposited. The first-deposited segments of each conductor are left uninsulated in sufficient areas to assure full electrical contact with the last-deposited segments of the same conductor.

Summary of the Invention

Figure 1A:
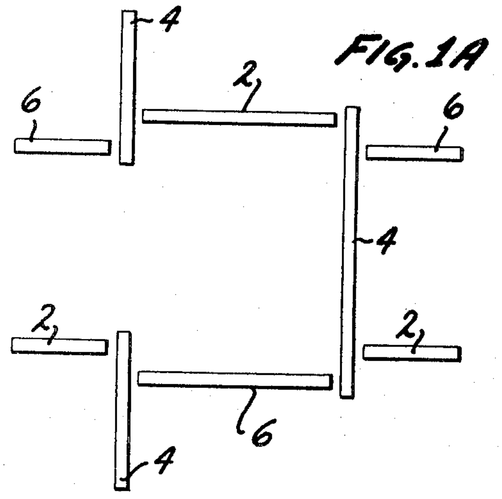

This invention relates to core memories for computers, and more particularly to a method of manufacturing thin-film planar core memories that is less complicated and more accurate than any known to the prior art, thereby facilitating the production of more closely-packed and less expensive cores.

Traditionally, ferrite cores for use in computer memories have been manufactured individually, then "threaded" with conductors, both "drive" and "sense" wires, to produce the memory. The immense cost per core of the threading operation has forced manufacturers to ship cores to low-cost-labor areas for threading; and the need for easy threading has seriously limited the amount of core-miniaturization and packing density available to memory designers. Thus, much research and thought have been devoted to producing "planar" core memories, i.e., to a process and finished core not requiring threading or other physical handling during manufacture.

The forefront of the prior art is represented by *U.S. Pat. 3,085,899—Forman and Electronics,* May 11, 1970 issue, both of which show alternative processes for making planar core memories. The process described in *Electronics* requires over 40 steps and, even worse, includes many different types of manufacturing techniques: chemical etching (both of the toroids and of the drive and sense lines) and photolithographic, photoresist, electro- and electroless plating. Both the number of steps and the variety of processes greatly increase the cost per core of the finished product.

An even greater disadvantage of the prior art processes is their limited fineness capability—the size of each element and the corresponding packing density has been very unfavorable, compared with what could be achieved. As a correlary to this problem, large prior art core depositions have been subject to cracking due to humidity, and are unreliable due to being overly sensitive to shocks, subject to crumbling, wire-cracking, etc.

It is, therefore, the general object of this invention to provide an improved deposited core memory. Another object is to provide a deposited core memory that is smaller and capable of greater packing densities than has heretofore been achieved. Another object is to provide a process for manufacturing deposited core memories that is cheaper, has less steps, and utilizes minimum manufacturing techniques.

In the achievement of the above and other objects and as a feature of this invention there is provided a High Density Planar Core Memory and process for the production thereof wherein a planar toroid is deposited on a suitable substrate, preferably ceramic or glass, by first vacuum-depositing a lower level of conductor material so masked as to form those portions of the conductive (X and Y) and sense lines passing under each toroid, then covering said lower conductor level with a deposited layer of insulative material. As another feature of this invention, this insulative layer (the "lower insulative layer") is deposited using a mask over certain portions of the X, Y, and sense lines which: (a) will not be covered or contacted at all by the deposition of core material upon the lower insulative layer; and (b) will come in contact with or overlap subsequent conductive line deposits, so that those portions of the X, Y, and sense lines in the lower conductive layer will come into contact with the remaining portions of their respective X, Y, and sense lines laid down in the upper conductive layer.

Following deposit of the lower insulative layer, the toroids themselves are laid down, in two steps due to the masking problem. As stated above, the toroids must lie in areas covered by the lower insulative layer, so that no contact with the lower conductive layer can occur. As another feature of this invention, the toroids are deposited in a composition that will give zero magneto-striction to avoid stresses between the toroid and their surrounding material (insulating layers or substrate) that could lead to separation, crumbling, etc. "Permalloy," 80% Ni and 20% Fe, is preferred for this function.

After deposit of the toroids, the upper insulating layer is laid down, with masking similar to the masking of the lower insulating layer, so that the toroids are still left insulated from the X, Y, and sense lines.

Other objects and features of this invention and a fuller understanding thereof may be had by referring to the following description and claims taken in conjunction with the accompanying drawings.

Reference to the Drawings

Figure 1B:
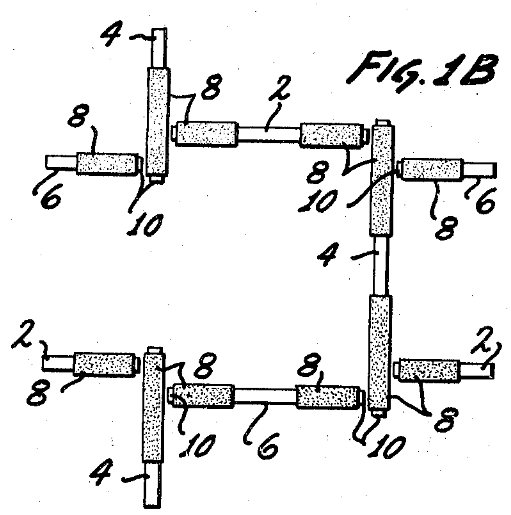
Figure 1C:
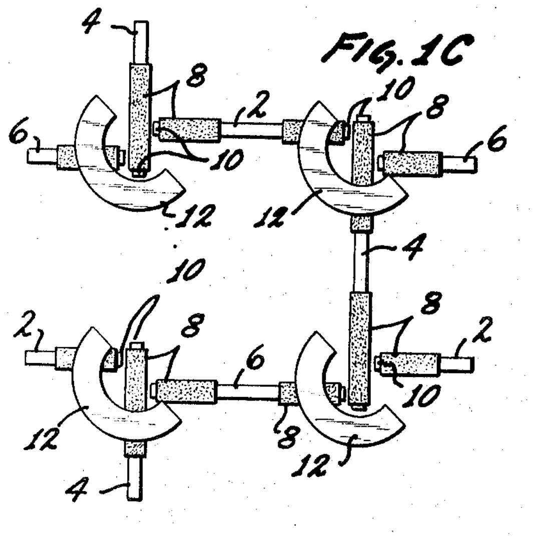
Figure 1D:
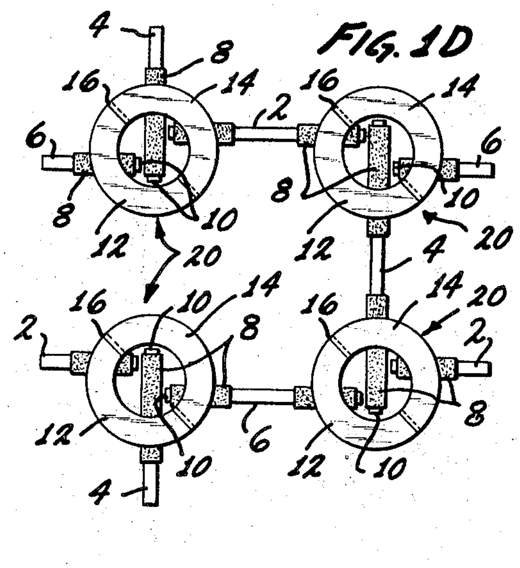
Figure 1E:
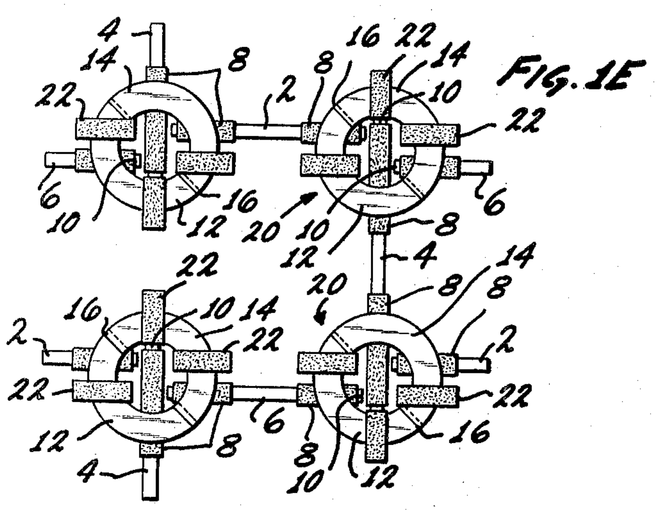
Figure 1F:
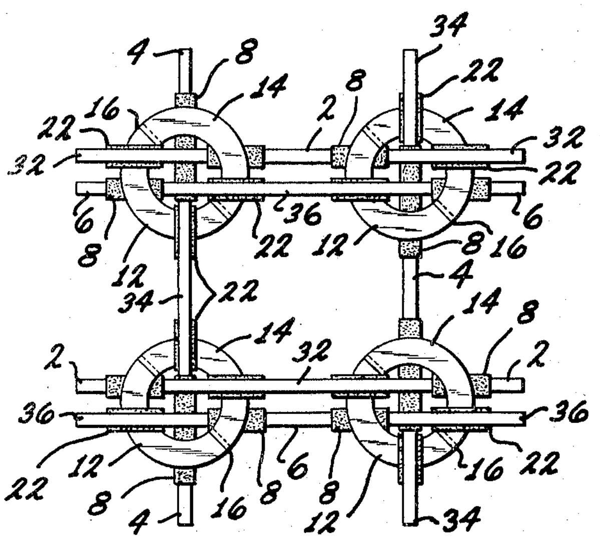
Figure 2:
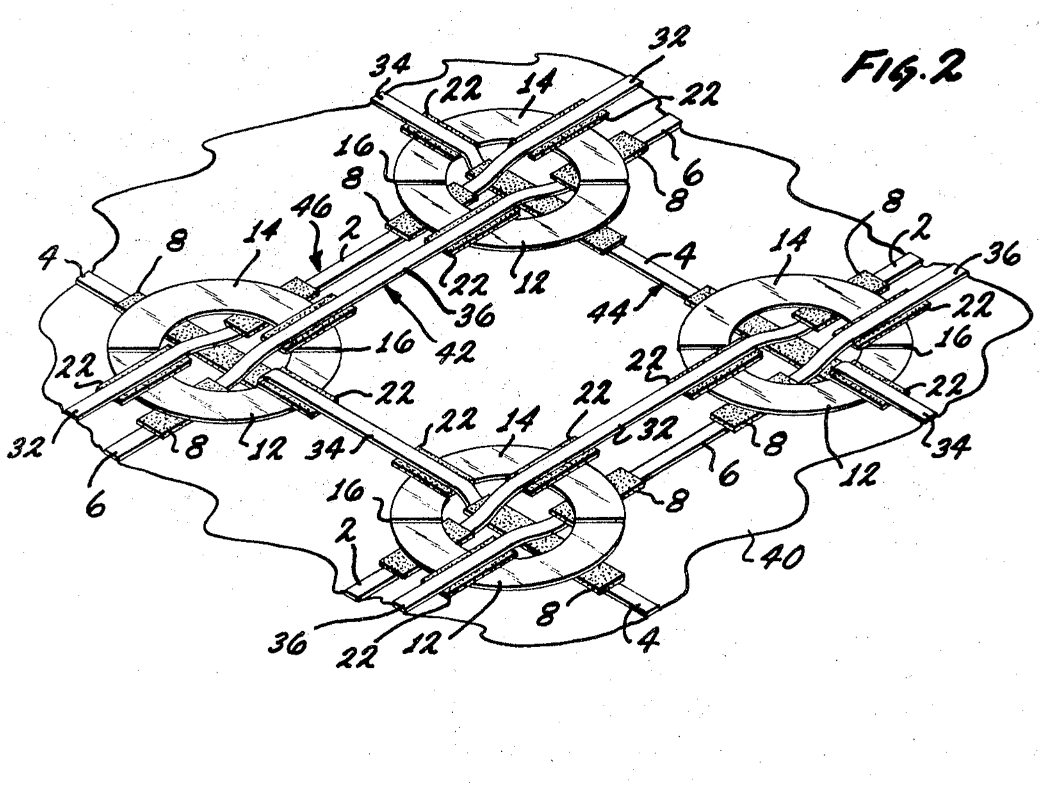

FIG. 1 (A–F) is a plan view showing the production of a planar core memory according to the process described herein after each step of deposition; and FIG. 2 is a perspective view of four cores in a planar core memory according to the design concepts set forth in this application.

Detailed Description

Referring to FIG. 1A, the deposited materials shown therein are the respective lower portions of two X-lines 2, Y-lines 4, and sense-lines 6 to be associated with four planar cores 20 to be deposited in the third and fourth steps of the inventive process (FIGS. 1C and 1D). These electrically-conductive lines are preferably vacuum-deposited by an electron beam or some equivalent process, using, in dual source arrangement, chromium and copper, or other equivalent electrically conductive materials. Preferably, the first step deposition should begin with a thin film of pure chromium, then switch to copper for the build-up of the conductor. The first step may be performed with one mask and without breaking vacuum if a dual source method is followed. The three types of electrical lines 2, 4, and 6 are referred to collectively throughout this application as the electrical conductors, or sometimes as the input and output lines.

Referring to FIG. 1B, following the first step of depositing the lower portions 2, 4, and 6 of the electrical conductors, the first insulating layer 8 is laid down, using a silica film ($SiO_2$) or its equivalent. It should be noted that the first insulating layer 8 covers much but not all of the electrical conductors 2, 4, and 6. In particular, the insulating layer 8 must leave uncovered small portions 10 of the conductors 2, 4, and 6 which, as the inventive process proceeds, will form an electrical contact with the later-deposited portions of the same conductors, deposited as shown in FIG. 1F and described in more detail in connection with that figure.

Following the deposition of the first insulating layer 8, the first portion of the toroids 12 are laid down. Of course, due to the limitations of vacuum-deposited mask-making, the toroids must be laid down in two steps, shown in FIGS. 1C and 1D, using a different mask for each portion. FIG. 1D illustrates the core planar memory according to the instant invention after the second portion 14 of each toroid 20 has been deposited, according to the fourth step of the invention. The first toroid portion 12 and the second toroid portion 14 are, of course, laid down such that they overlap one another in two junction areas 16, in order to provide physical connection such that each toroid 20 is an integrated whole as respects its magnetic and electrical properties.

In connection with the steps of the inventive process shown in FIGS. 1C and 1D, whereby the toroids 20 are deposited, it is important to state Applicants' preferred materials and technology for performing these steps. The toroids 20 are preferably vacuum-deposited permalloy cores, having closely controlled magnetic properties and physical dimensions. In order that the dimensions and accuracy shall be as perfect as the mask will allow, the magnetic materials (approximately 80% Ni; 20% Fe) should be electron-beam deposited, by any such process providing the required accuracy. The use of an electron-beam gun for the toroid deposition is almost a necessity, because of the fact that iron and nickel have different evaporation characteristics and, even worse, change in evaporation characteristics as the evaporation process proceeds. In particular, the iron tends to deposit before other materials with which it is associated in the evaporation-diffusion-deposition process. The use of electron-beam technology avoids this problem, so that the magnetic properties of the cores 20 can be kept under close control.

Following the third and fourth steps of the inventive process wherein the toroids 20 are laid down, a second insulating layer 22, preferably of the same material as the first insulating layer 8 described in connection with FIG. 1B, is laid down essentially to cover those portions of the newly-deposited toroids 20 that would otherwise be contacted by the conductors 2, 4, and 6. Following the deposition of the second insulating layer 22, the upper portions 32, 34, and 36 of the X, Y, and sense lines, respectively, are deposited as shown in FIG. 1F and according to the preferred process described in the discussion of the deposition of the first portions 2, 4, and 6 in connection with FIG. 1A. The sixth step providing the upper portions 32, 34, and 36 causes said upper portions to be laid down in physical and electrical connection with the exposed areas 10 of the first portion (see FIG. 1B), which permits the finished X lines (2–32), Y lines (4–34) and sense lines (6–36) to appear in a planar core memory deposited according to the instant invention as integral wholes for purposes not only of electrical conduction, but also both of impedance characteristics, which must be kept under close control, and also of physical integrity, important as regards crumbling and cracking under temperature change and humidity change.

Referring to FIG. 2, the perspective view of four cores 20 and their associated electrical conductors shows only a small illustrative segment of a planar core memory deposited according to the principles of this invention. Such a memory comprises a substrate 40 upon which the cores 20 are deposited. Each core 20 has its associated X line 42, Y line 44, and sense lines 46 passing through the center hole of the toroid in order that each such line 42, 44, and 46 may interact in an electro-magnetic manner with each toroid 20. The manner of reading into a memory as illustrated in FIG. 2, or into any particular core 20 therein, is well known in the computer art and will not be further discussed here. Suffice to say that the memory elements shown in FIG. 2, if made according to the principles of this invention, provide a more compact and more durable planar core memory than has heretofore been achieved.

Planar core memory elements according to the principles of this invention have been made with a spacing of 0.030" between toroids, giving a bit density of 1100 bits/in.$^2$, one-tenth the bit density previously achieved. The pure chromium film under the X, Y, and sense lines was 500 A. thick, and the $SiO_2$ layer was approximately 500 A. or more. The Ni/Fe ratio of the toroid permalloy was closely controlled to produce a substantial zero magneto-strictive film.

Although this invention has been described in its preferred form with a certain degree of particularity, it should be understood that the present disclosure of the preferred form has been made only by way of example and that numerous changes in the details of construction and in the combination and arrangement of the parts may be resorted to without departing from the spirit and the scope of the invention as hereinafter claimed.

What is claimed is:

1. A process for depositing a planar core memory on a substrate, which memory includes a toroidal core, first and second input electrical conductors, and a sense conductor, the process comprising the steps of:

(a) depositing elongated lower portions of the conductors on the substrate, the lower portions being disposed such that all conductor areas passing under the core are included with the lower portions;

(b) depositing a first insulating layer over the lower portions of said conductors, the first insulating layer being deposited selectively to cover the lower portions in areas where later deposits of the core or conductors are to be made and to leave uncovered the ends of the lower portions, which ends are to be brought into electrical contact with complementary later deposits of the conductors;

(c) depositing a first semicircular core portion over the first insulating layer;

(d) depositing a second semicircular core portion over the first insulating layer, the second core portion joining with the first core portion to form a complete toroidal core;

(e) depositing a second insulating layer over selected areas of the core deposited according to steps (c) and (d), the second insulating layer having the characteristic of leaving uncovered the lower portion ends which are to be brought into electrical contact with complementary later deposits of the conductors; and (f) depositing upper complementary portions of the conductors, such that the upper portions join with the lower portions previously deposited during step (a) to form complete first and second input conductors and a sense conductor.

2. The process according to Claim 1 in which the first and second core portions are deposited using an electron-beam vacuum deposition method.

3. The process according to Claim 1 in which the conductor portions are deposited utilizing a single-vacuum, dual-source electron beam method.

4. A process for depositing a planar core memory over a substrate, which memory including a toroid, X and Y input electrical lines passing through the toroid, and at least one sense line passing through the toroid, the process comprising the following steps:

(a) depositing elongated lower portions of the X, Y, and sense lines, by a dual-source, electron beam, vacumm-deposit method using chromium and copper, the lower portions being disposed such that all conductor areas passing under the toroid are included with the lower portions;

(b) depositing a first insulating layer of silica over the lower portions of the X, Y, and sense lines, the first insulating layer being deposited selectively to cover the lower portions in areas where later deposits of the toroid or the X, Y, and sense lines are to be made and to leave uncovered the ends of the lower portions which are to be brought into electrical contact with complementary later deposits of the X, Y, and sense lines, respectively;

(c) electron-beam depositing a first semicircular portion of the toroid over the first insulating layer;

(d) electron-beam depositing a second semicircular portion of said toroid over the first insulating layer, the second portion joining with the first portion of the toroid to form a complete toroid;

(e) depositing a second insulating layer over selected areas of the toroid deposited according to steps (c) and (d), the second insulating layer having the characteristic of leaving uncovered the lower portion ends which are to be brought into electrical contact with later complementary deposits of the conductors; and (f) depositing upper complementary portions of the X, Y, and sense lines by a dual-source, electron beam, vacuum-deposit method using chromium and copper, such that the upper portions join with the lower portions previously deposited during step (a) to form complete X, Y, and sense lines for the planar core memory.

References Cited

UNITED STATES PATENTS

| | | | |
|---|---|---|---|
| 3,510,349 | 5/1970 | Jones | 117—107 |
| 3,713,885 | 1/1973 | Betremieux et al. | 117—212 |
| 3,085,899 | 4/1963 | Forman | 117—238 |
| 3,655,430 | 4/1972 | Greaves | 117—107 |
| 3,677,843 | 7/1972 | Reiss | 117—107 |
| 3,445,830 | 5/1969 | Middelhoek | 117—239 |
| 3,515,606 | 6/1970 | Crowther | 117—240 |
| 3,492,663 | 1/1970 | Bobeck et al. | 117—239 |
| 3,518,636 | 6/1970 | Pulliam et al. | 117—239 |

CHARLES E. VAN HORN, Primary Examiner

J. W. MASSIE, Assistant Examiner

U.S. Cl. X.R.

117—71 R, 93.3, 107, 119, 217, 234; 340—174 DB, 174 TA